(12) United States Patent
Koishi et al.

(10) Patent No.: US 10,360,462 B2
(45) Date of Patent: Jul. 23, 2019

(54) IMAGE PROCESSING DEVICE, STEREO CAMERA DEVICE, VEHICLE, AND IMAGE PROCESSING METHOD

(71) Applicant: KYOCERA Corporation, Kyoto (JP)

(72) Inventors: Tomofumi Koishi, Tochigi (JP); Shushin Inoue, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 25 days.

(21) Appl. No.: 15/738,593

(22) PCT Filed: Jun. 24, 2016

(86) PCT No.: PCT/JP2016/003058
§ 371 (c)(1),
(2) Date: Dec. 21, 2017

(87) PCT Pub. No.: WO2016/208200
PCT Pub. Date: Dec. 29, 2016

(65) Prior Publication Data
US 2018/0165528 A1 Jun. 14, 2018

(30) Foreign Application Priority Data
Jun. 24, 2015 (JP) .................................. 2015-126817

(51) Int. Cl.
*H04N 13/246* (2018.01)
*G06T 7/80* (2017.01)
(Continued)

(52) U.S. Cl.
CPC .......... *G06K 9/00805* (2013.01); *G01C 3/14* (2013.01); *G01C 25/00* (2013.01); *G03B 35/08* (2013.01);
(Continued)

(58) Field of Classification Search
None
See application file for complete search history.

(56) References Cited

U.S. PATENT DOCUMENTS

| 5,383,013 A | 1/1995 | Cox |
| 6,552,742 B1 | 4/2003 | Seta |

(Continued)

FOREIGN PATENT DOCUMENTS

| JP | H07-103734 A | 4/1995 |
| JP | 2001-082955 A | 3/2001 |

(Continued)

OTHER PUBLICATIONS

International Search Report issued in PCT/JP2016/003058; dated Sep. 13, 2016.

(Continued)

*Primary Examiner* — Christopher Braniff
(74) *Attorney, Agent, or Firm* — Studebaker & Brackett PC

(57) ABSTRACT

Provided is an image processing device including: an input interface, which is configured to acquire a first captured image and a second captured image that are captured by a plurality of imaging units and; and a controller, which is configured to calculate parallax by performing a one-dimensional matching based on pixel values of the first captured image and pixel values of the second captured image, extracts one or more first feature points from a region in the first captured image that includes continuous pixels having a difference in parallax which is within a predetermined range, extract one or more second feature points corresponding respectively to the first feature points by performing a two-dimensional matching with the first feature points, and calibrate the imaging unit based on positions of the first feature points and positions of the second feature points.

9 Claims, 6 Drawing Sheets

(51) Int. Cl.
*H04N 7/18* (2006.01)
*G06K 9/00* (2006.01)
*G03B 35/08* (2006.01)
*G06T 1/00* (2006.01)
*H04N 13/204* (2018.01)
*G06F 3/01* (2006.01)
*H04N 5/232* (2006.01)
*G01C 3/14* (2006.01)
*G01C 25/00* (2006.01)

(52) U.S. Cl.
CPC ............... *G06F 3/01* (2013.01); *G06T 1/00* (2013.01); *G06T 7/85* (2017.01); *H04N 5/232* (2013.01); *H04N 7/18* (2013.01); *H04N 13/204* (2018.05); *H04N 13/246* (2018.05); *G06T 2207/30261* (2013.01)

(56) References Cited

U.S. PATENT DOCUMENTS

| | | | |
|---|---|---|---|
| 8,922,623 | B2 | 12/2014 | Nishimura et al. |
| 8,922,626 | B2 | 12/2014 | Aoki |
| 9,185,382 | B2 | 11/2015 | Nishimura et al. |
| 2012/0026295 | A1 | 2/2012 | Nishimura et al. |
| 2012/0236124 | A1* | 9/2012 | Aoki ............... G01C 3/085 348/47 |
| 2015/0071498 | A1 | 3/2015 | Nishimura et al. |

FOREIGN PATENT DOCUMENTS

| | | |
|---|---|---|
| JP | 2001-266144 A | 9/2001 |
| JP | 2004-053407 A | 2/2004 |
| JP | 2012-198075 A | 10/2012 |
| JP | 2013-239170 A | 11/2013 |

OTHER PUBLICATIONS

Written Opinion issued in PCT/JP2016/003058; dated Sep. 13, 2016; with English language Concise Explanation.

Wanli et al.; An Approach for Stereo Matching Using Pair-wise Sequence Alignment Algorithm Based on Dynamic Programming; 2010 International Conference on Challenges in Environmental Science and Computer Engineering; 2010; pp. 511-514.

* cited by examiner

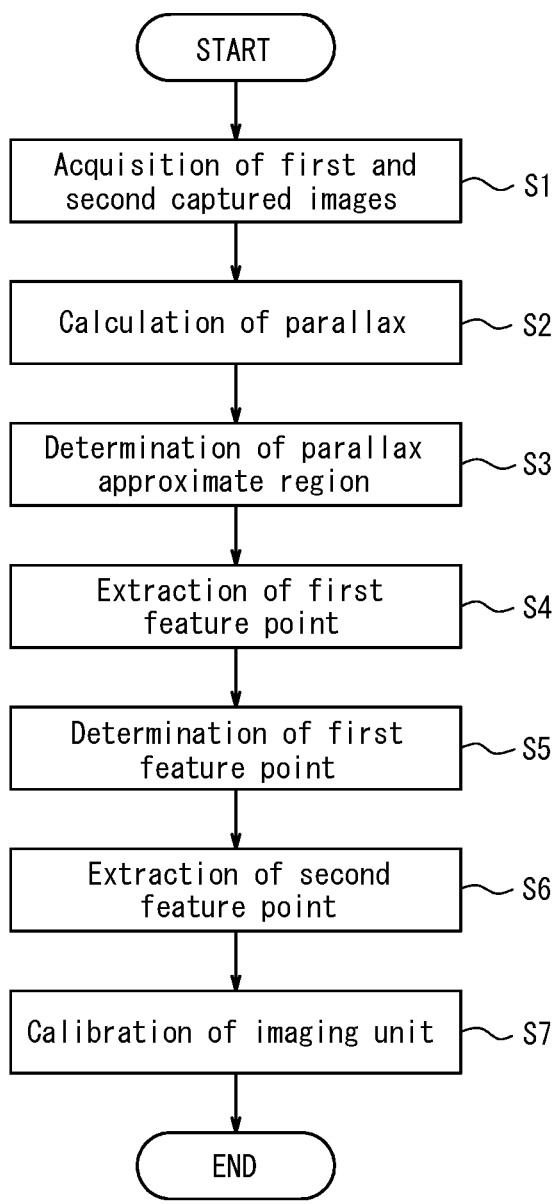

IMAGE PROCESSING DEVICE, STEREO CAMERA DEVICE, VEHICLE, AND IMAGE PROCESSING METHOD

CROSS-REFERENCE TO RELATED APPLICATION

This application claims priority from and the benefit of Japanese Patent Application No. 2015-126817 filed on Jun. 24, 2015, the entire contents of which are incorporated herein by reference.

TECHNICAL FIELD

The present disclosure relates to an image processing device, a stereo camera device, a vehicle, and an image processing method.

BACKGROUND

In recent years, stereo cameras that simultaneously capture images of a target, such as an object or a human, using a plurality of cameras, and that use the captured images to measure a distance to the target based on the triangulation principle, are known. Such a stereo cameras may be mounted, for example, to a vehicle to inform a driver of the presence of a target that is present in the vicinity of the vehicle and to assist safe driving.

SUMMARY

One of aspects of the present disclosure resides in an image processing device that is configured to calibrate a stereo camera including a plurality of imaging units and that includes an input interface and a controller. The input interface is configured to acquire a first captured image and a second captured image captured by the plurality of imaging units. The controller is configured to calculate parallax by performing a one-dimensional matching based on pixel values of the first captured image and pixel values of the second captured image. The controller is also configured to extract one or more first feature points from a region in the first captured image that includes continuous pixels having a difference in parallax which is within a predetermined range and extract one or more second feature points corresponding respectively to the one or more first feature points by performing a two-dimensional matching between the one or more first feature points and pixels in the second captured image. The controller is also configured to calibrate at least one of the plurality of imaging units based on positions of the one or more first feature points and positions of the one or more second feature points.

Another aspect of the present disclosure resides in a stereo camera device, including: a plurality of imaging units; and an image processing device that is configured to calibrate a stereo camera including the plurality of imaging units. The image processing device includes an input interface and a controller. The input interface is configured to receive input of a first captured image and a second captured image captured by the plurality of imaging units. The controller is configured to calculate parallax by performing a one-dimensional matching based on pixel values of the first captured image and pixel values of the second captured image. The controller is also configured to extract one or more first feature points from a region in the first captured image that includes continuous pixels having a difference in parallax which is within a predetermined range and extract one or more second feature points corresponding respectively to the one or more first feature points by performing a two-dimensional matching between the one or more first feature points and pixels in the second captured image. The controller is also configured to calibrate at least one of the plurality of imaging units based on positions of the one or more first feature points and positions of the one or more second feature points.

Yet another aspect of the present disclosure resides in a vehicle, including a stereo camera device. The stereo camera device includes: a plurality of imaging units; and an image processing device that is configured to calibrate a stereo camera including the plurality of imaging units. The image processing device includes an input interface and a controller. The input interface is configured to receive input of a first captured image and a second captured image captured by the plurality of imaging units. The controller is configured to calculate parallax by performing a one-dimensional matching based on pixel values of the first captured image and pixel values of the second captured image. The controller is also configured to extract one or more first feature points from a region in the first captured image that includes continuous pixels having a difference in parallax which is within a predetermined range and extract one or more second feature points corresponding respectively to the one or more first feature points by performing a two-dimensional matching between the one or more feature points and pixels in the second captured image. The controller is also configured to calibrate at least one of the plurality of imaging units based on positions of the one or more first feature points and positions of the one or more second feature points.

Yet another aspect of the present disclosure resides in an image processing method performed by an image processing device configured to calibrate a stereo camera including a plurality of imaging units, that is, the image processing method, in which a controller in the image processing device performs steps including calculating parallax by performing a one-dimensional matching based on pixel values of a first captured image captured by a first imaging unit in a plurality of imaging units and pixel values in a second captured image captured by a second imaging unit in the plurality of imaging units that is different from the first imaging unit, extracting one or more first feature points from a region in the first captured image that includes continuous pixels having a difference in parallax which is within a predetermined range, extracting one or more second feature points corresponding respectively to the one or more first feature points by performing a two-dimensional matching between the one or more first feature points and pixels in the second captured image, and calibrating at least one of the plurality of imaging units based on positions of the one or more first feature points and positions of the one or more second feature points.

BRIEF DESCRIPTION OF THE DRAWINGS

In the accompanying drawings:

FIG. 6 is a flowchart illustrating processing performed by the image processing device illustrated in FIG. 1.

DETAILED DESCRIPTION

In order to accurately notify a user of the distance to a target in the vicinity thereof a stereo camera, must accurately measure a distance from a plurality of cameras to the target to be captured by the plurality of cameras. However, when the plurality of cameras is mounted at positions which deviate from a standard, the distance to the target cannot be measured with accuracy.

Accordingly, an existing calibration method determines that a reference region is appropriate for matching and accurately calibrates the horizontality of the camera when the maximum appearance frequency of the distances in real space to the subject captured in the reference region is greater than a predetermined value.

According to the above calibration method, since the reference region appropriate for matching is determined based on the maximum appearance frequency of the distances to the subject, a distance distribution histogram needs to be generated, and this processing may require time. Furthermore, when positions in the reference region in which a portion corresponding to the distance of the maximum appearance frequency is captured are discrete, occlusion may occur in the reference region, and this makes accurate matching difficult.

An image processing device according to the present disclosure calibrates an imaging unit by performing a one-dimensional matching to calculate parallax and a two-dimensional matching with at least one first feature point in a first captured image captured by the stereo camera to extract a second feature point in a second captured image that corresponds to the first feature point.

The image processing device of the present disclosure is described in detail below with reference to the drawings.

Figure 1:
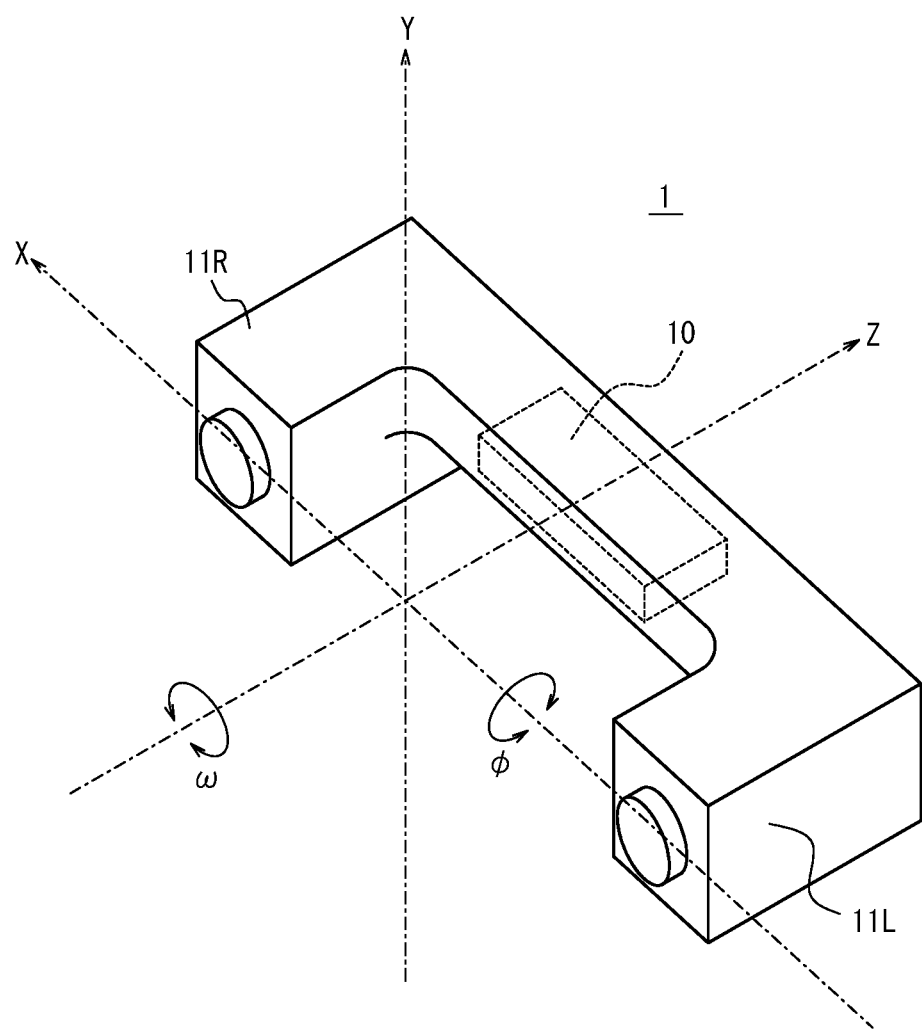
FIG. 1 is a perspective view of a stereo camera device including an image processing device according to an embodiment.

As illustrated in FIG. 1, a stereo camera device 1 includes a plurality of imaging units 11L and 11R having optical axes that are not overlapping with each other, and an image processor 10. In the description below, the image processor 10 may also be called an image processing device. Accordingly, a plurality of images captured simultaneously by the plurality of imaging units 11L and 11R will have parallax d.

The term "simultaneous" as used herein is not limited to the exact same time. For example, "simultaneous" imaging as used in the disclosure includes (i) the plurality of cameras capturing images at the same time, (ii) the plurality of cameras capturing images in response to the same signal, and (iii) the plurality of cameras capturing images at the same time according to respective internal clocks. The imaging start time, the imaging end time, the transmission time of captured image data, and the time at which another device receives image data are included in the time standard for imaging. The stereo camera device 1 may include a plurality of cameras in a single housing. The stereo camera device 1 may also include two or more independent cameras positioned apart from each other. The stereo camera device 1 is not limited to a plurality of independent cameras. In the present disclosure, a camera having an optical mechanism that guides light incident at two separate locations to one optical detector, for example, may be adopted as the stereo camera device 1.

The first imaging unit 11L and the second imaging unit 11R include a solid-state image sensor. A solid-state image sensor includes Charge-Coupled Device (CCD) image sensor and a Complementary MOS (CMOS) image sensor. The first imaging unit 11L and the second imaging unit 11R may include a lens mechanism. The first imaging unit 11L and the second imaging unit 11R capture an image of real space to generate a first captured image 14L and a second captured image 14R.

Figure 2:
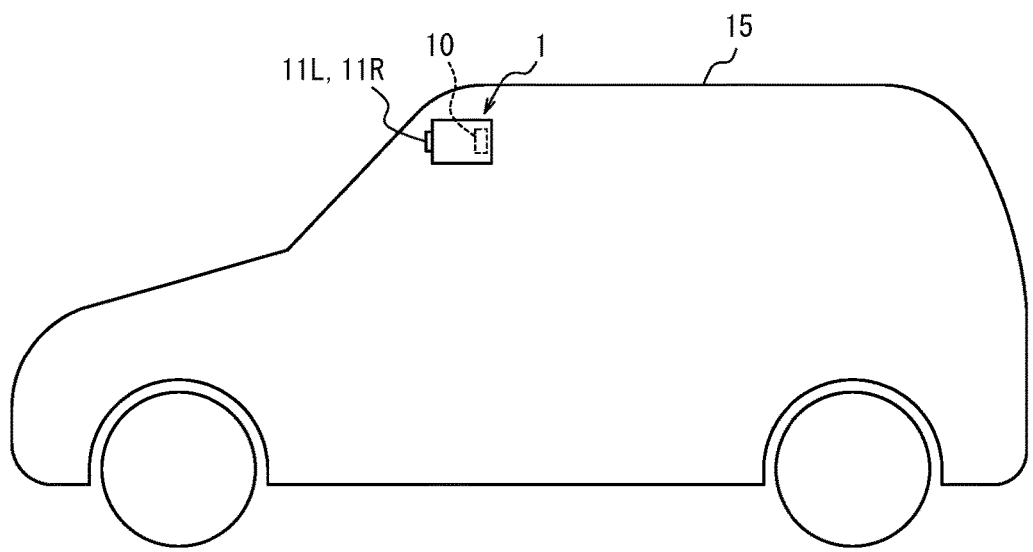
FIG. 2 is a side view of a vehicle in which the stereo camera device illustrated in FIG. 1 is mounted.

The plurality of imaging units 11L and 11R is mounted in a vehicle 15, which is placed on a horizontal plane as illustrated in FIG. 2, in a manner such that the optical axes of the imaging units 11L and 11R are parallel, lens surfaces and imaging surfaces of the imaging units 11L and 11R are on the same planes, and the baseline length direction is horizontal. In the state where the two imaging units 11L and 11R are mounted in the correct position and correct posture, the stereo camera device 1 is able to measure a distance from the stereo camera device 1 to the subject with accuracy. Hereinafter, one of the two imaging units 11L and 11R that is mounted on the left side when looking at the stereo camera device 1 from the opposite side of the subject is called the first imaging unit 11L, and the other one that is mounted on the right side is called the second imaging unit 11R.

In the present embodiment, the first imaging unit 11L and the second imaging unit 11R are able to capture an image of the outside of the vehicle 15 via the windshield of the vehicle 15. In the present embodiment, the first imaging unit 11L and the second imaging unit 11R may be fixed to any one of the front bumper, the fender grill, the side fenders, the light modules, and the bonnet of the vehicle 15.

The term "parallel" as used above is not limited to strict parallelism. The term "parallel" may encompass a substantially parallel state in which the optical axes of the imaging units 11L and 11R are considered substantially parallel, e.g., misaligned and not perfectly parallel. The term "horizontal" as used above is not limited to strict horizontality. The term "horizontal" may encompass a substantially horizontal state in which the baseline length direction is for example deviated from the perfectly horizontal position with respect to the direction of the horizon plane.

Here, "vehicle" in the present disclosure includes, but is not limited to, automobiles, railway vehicles, industrial vehicles, and vehicles for daily life. For example, "vehicle" may include aircraft that travel down a runway. Automobiles include, but are not limited to, passenger vehicles, trucks, buses, two-wheeled vehicles, and trolley buses, and may include other vehicles that drive on a road. Railway vehicles include, but are not limited to, locomotives, freight cars, passenger cars, streetcars, guided railway vehicles, ropeways, cable cars, linear motor cars, and monorails, and may include other vehicles that travel along a rail. Industrial vehicles include industrial vehicles for agriculture and for construction. Industrial vehicles include, but are not limited to, forklifts and golf carts. Industrial vehicles for agriculture include, but are not limited to, tractors, cultivators, translators, binders, combines, and lawnmowers. Industrial vehicles for construction include, but are not limited to, bulldozers, scrapers, backhoes, cranes, dump cars, and road rollers. Vehicles for daily life include, but are not limited to, bicycles, wheelchairs, baby carriages, wheelbarrows, and motorized, two-wheeled standing vehicles. Power engines for the vehicle include, but are not limited to, internal-combustion engines including diesel engines, gasoline engines, and hydrogen engines, and electrical engines including motors. The "vehicle" is not limited to the above-listed types. For example, automobiles may include industrial vehicles that can drive on a road, and the same vehicle may be included in multiple categories.

Figure 3:
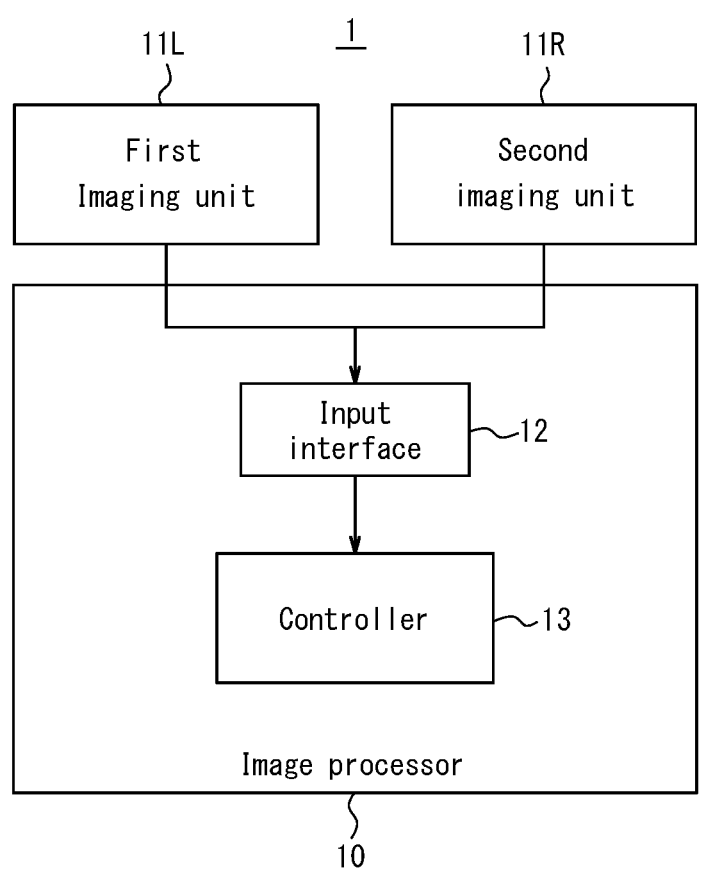
FIG. 3 is a configuration diagram of the stereo camera device illustrated in FIG. 1.

Next, the image processor 10 is described with reference to FIG. 3. As illustrated in FIG. 3, the image processor 10 includes an input interface 12 and a controller 13.

The input interface 12 is an input interface for inputting image data to the image processor 10. A physical connector or a wireless communication device may be used in the input interface 12. Physical connectors include an electrical connector corresponding to transmission by an electric signal, an optical connector corresponding to transmission by an optical signal, and an electromagnetic connector corresponding to transmission by an electromagnetic wave. Electrical connectors include connectors conforming to IEC60603, connectors conforming to the USB standard, connectors comprising an RCA terminal, connectors comprising an S terminal prescribed by EIAJ CP-1211A, connectors comprising a D terminal prescribed by EIAJ RC-5237, connectors conforming to the HDMI® (HDMI is a registered trademark in Japan, other countries, or both) standard, and connector corresponding to a coaxial cable that includes a BNC terminal. Optical connectors include a variety of connectors conforming to IEC 61754. Wireless communication devices include wireless communication devices conforming to standards that include Bluetooth® (Bluetooth is a registered trademark in Japan, other countries, or both) and IEEE802.11. The wireless communication device includes at least one antenna.

Image data of images captured by the first imaging unit 11L and the second imaging unit 11R is inputted to the input interface 12. The input interface 12 delivers the inputted image data to the controller 13. Input to the input interface 12 includes signals input over a wired cable and signals input over a wireless connection. The input interface 12 may correspond to the transmission method of an image signal in the stereo camera device 1.

The controller 13 includes one or a plurality of processors. The controller 13 or the processors may include one or a plurality of memories that store programs for various processing and information on which operations are being performed. Memories include volatile and nonvolatile memories. Memories also include those independent of processors and those embedded in processors. Processors include universal processors that execute particular functions by reading particular programs and dedicated processors that are specialized for particular processing. Dedicated processors include an Application Specific Integrated Circuit (ASIC) for a specific application. Processors include a Programmable Logic Device (PLD). PLDs include a Field-Programmable Gate Array (FPGA). The controller 13 may be either a System-on-a-Chip (SoC) or a System in a Package (SiP) with one processor or a plurality of processors that work together.

The controller 13 measures the distance in real space from the stereo camera device 1 to the subject captured in the first captured image 14L and the second captured image 14R, which have been inputted to the input interface 12.

In the stereo camera device 1, the controller 13 calculates the distance from the stereo camera device 1 to the subject in a spatial coordinate system as illustrated in FIG. 1. The spatial coordinate system includes an X-axis in the direction of the baseline length and a Y-axis and a Z-axis in two directions that are perpendicular to the baseline length and that are also perpendicular with respect to each other, with any point being defined as the origin. The optical axes of the first imaging unit 11L and the second imaging unit 11R are parallel to Z-axis, the row direction of the imaging surfaces is parallel to X-axis, and the columnar direction of the imaging surfaces is parallel to Y-axis. The rotation angle around X-axis is defined as pitch angle $\phi$, and the rotation angle around Z-axis is defined as rho angle $\omega$ in the spatial coordinate system.

In the stereo camera device 1, both of the optical axes are parallel to Z-axis, and the columnar direction of the imaging surfaces is parallel to Y-axis, which is perpendicular to the baseline length direction. Accordingly, the positions of spot images of the same subject differ only in the row direction in the first captured image 14L and in the second captured image 14R. Accordingly, to perform calculation of the distance at a high speed such as 30 fps, the stereo camera device 1 performs one-dimensional matching along the direction parallel to the baseline length, i.e., along the X-axis direction, to bring the spot images of the same subject in the first captured image 14L and in the second captured image 14R into correspondence with each other.

However, the accuracy of the correspondence between the spot images according to the above one-dimensional matching decreases as a displacement $\Delta Y$ along the Y-axis direction of the first imaging unit 11L with respect to the second imaging unit 11R in external orientation parameters increases. Similarly, the accuracy of the correspondence between the spot images according to the one-dimensional matching decreases as misalignment $\Delta\phi$ of pitch angle $\phi$ of the optical axes increases. To address the above, as described below, the stereo camera device 1 performs calibration, for at least one of the position Y of the Y-axis direction and pitch angle $\phi$, the first imaging unit 11L, with reference to the second imaging unit 11R, based on the first captured image 14L and the second captured image 14R.

The controller 13 calculates parallax d of pixel positions in the first captured image 14L and in the second captured image 14R. The pixel positions in the first captured image 14L and in the second captured image 14R are represented by the image coordinate system (u, v), having a U-axis that is parallel to the row direction of the imaging surfaces and a V-axis that is parallel to the columnar direction of the imaging surfaces. The controller 13 calculates parallax d according to the one-dimensional matching along the row direction of the imaging surfaces. In detail, the controller 13 compares one-dimensional pixel value distribution in the U-axis direction at different v-coordinates in the first captured image 14L and one-dimensional pixel value distribution at the same v-coordinates in the second captured image 14R. The controller 13 calculates a difference in position of two pixels including pixel values corresponding to each other in the two distributions as parallax d.

Figure 4:
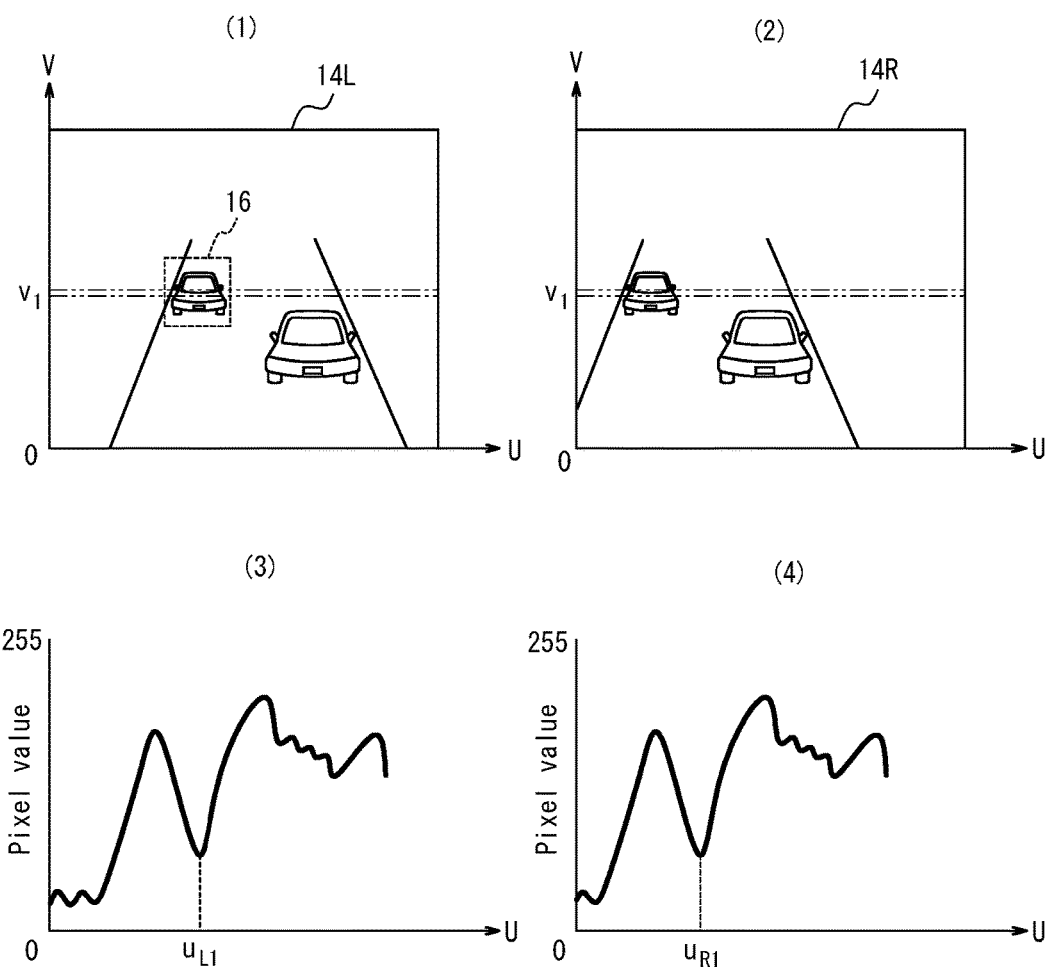
FIGS. 4(1) to 4(4) illustrate a first captured image and a second captured image, and one-dimensional pixel value distributions thereof, captured respectively by a first imaging unit and a second imaging unit illustrated in FIG. 1.

Here, a detailed description of a method to calculate parallax d is provided. The controller 13 determines a constant on V-axis for which parallax d is to be calculated. Here, the controller 13 is assumed to calculate parallax d for $v_1$ on the V-axis. The controller 13 extracts pixel values of different pixels at $v=v_1$ from the first captured image 14L and the second captured image 14R, as illustrated in FIGS. 4(1) and 4(2). Pixel value distributions extracted from the first captured image 14L and the second captured image 14R are illustrated for example in FIGS. 4(3) and 4(4). Based on the two extracted pixel value distributions, the controller 13 brings pixels of the second captured image 14R into correspondence with pixels of the first captured image 14L according to the one-dimensional matching. That is, the controller 13 extracts pixels on the second captured image 14R that are most likely to represent the spot image formed by pixels on the first captured image 14L and brings the extracted pixels into correspondence with the pixels on the first captured image 14L. The controller 13 calculates a difference between the position ($u_{L1}$, $v_1$) and the position ($u_{R1}$, $v_1$) of corresponding pixels respectively in the first captured image 14L and the second captured image 14R as parallax $d=u_{L1}-u_{R1}$.

The controller 13 determines a region in a parallax image that includes continuous pixels whose difference in parallax d between adjacent pixels is within a predetermined range as a parallax approximate region. A parallax image refers to an image representing shift amount of pixels forming the same spot image in two different captured images captured simultaneously. In the example of the present embodiment, a parallax image refers to an image representing a shift amount in the U-axis direction between the spot image in the first captured image 14L that corresponds to the pixels and the corresponding pixels of the same spot image in the second captured image 14R.

Figure 5:
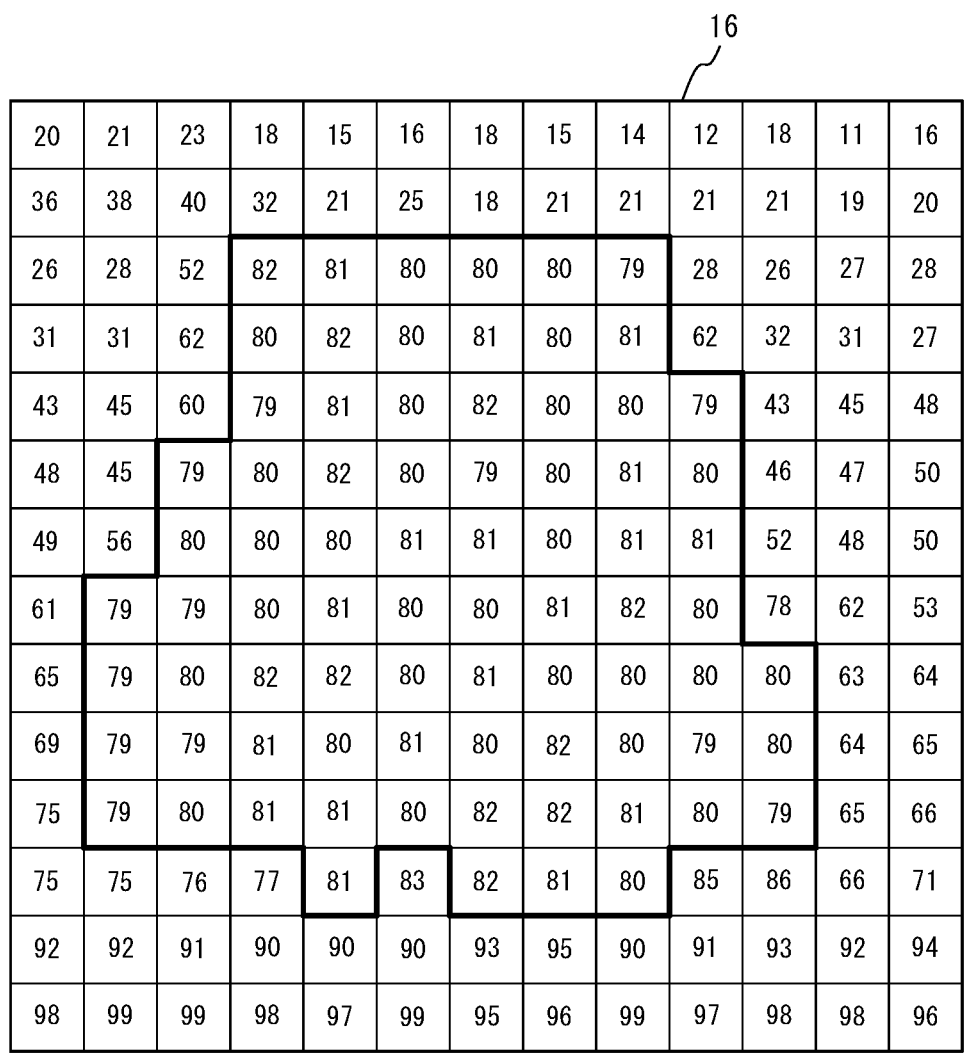
FIG. 5 is a conceptual view of parallax of pixels constituting a subject region of the first captured image illustrated in FIG. 4.

A description of the specific processing of the parallax approximate region is now provided with reference to the example illustrated in FIG. 5. FIG. 5 is a conceptual view of parallax d in a subject region 16 illustrated in FIG. 4(1). A plurality of squares each surrounding a number in FIG. 5 corresponds to the pixels in the subject region 16. Parallax d of each pixel is illustrated in the position of the pixel. The thick line in FIG. 5 corresponds to the pixels constituting an optical image of a vehicle in FIG. 4(1). Parallax d of the pixels surrounded by the thick line is generally within the range of 79 to 82. Parallax d changes depending on a distance from the stereo camera device 1. A subject located at substantially the same distance from the stereo camera device 1 is subjected to substantially the same parallax d. A subject with a measurable size on the first captured image 14L and on the second captured image 14R is located at substantially the same distance from the stereo camera device 1, and parallax d of the pixels forming the optical images of the subject is within a predetermined range. In other words, an object is present in a region in which parallax d is within a predetermined range. In the present embodiment, the controller 13 determines, as the parallax approximate region, a region including continuous pixels in which parallax d is within a predetermined range.

The controller 13 extracts from the parallax approximate region at least one first feature point $P_1$. The first feature point $P_1$ refers to a characteristic point on the first captured image 14L, that is, a point having a feature value of the pixel that satisfies predetermined requirements. For example, a vertex of edge at which a differential of brightness value is a predetermined value or more may be regarded as the first feature point $P_1$.

The controller 13 determines whether the first feature point $P_1$ extracted from the first captured image 14L is suitable to be used for calibration processing. When the first feature point $P_1$ is a part of at least one of a linear edge and a repetitive pattern, an error tends to occur in matching the second feature point $P_2$ with the first feature point $P_1$. For the above reason, the controller 13 determines whether the first feature point $P_1$ and a region including the vicinity of the first feature point $P_1$ include a linear pattern or a repetitive pattern. The second feature point $P_2$ refers to a feature point on the second captured image 14R that has a feature value within a predetermined range of the feature value of the first feature point $P_1$.

When it is determined that the first feature point $P_1$ is a part of at least one of a linear edge and a repetitive pattern, this first feature point $P_1$ is not used in the subsequent processing, and another first feature point $P_1$ different from this first feature point $P_1$ is used. When it is determined that the first feature point $P_1$ is not a part of at least one of a linear edge and a repetitive pattern, the controller 13 retrieves the second feature point $P_2$ corresponding to this first feature point $P_1$ for extraction by using a conventionally known two-dimensional pattern matching method. The controller 13 performs the two-dimensional pattern matching with sub-pixel precision by using for example the interpolation method.

A starting point $P_S$ of the retrieval of the second feature point $P_2$ in the second captured image 14R is positioned at ($u_{L2}+d$, $v_{L2}$), which is offset by parallax d in the U-axis direction from the position ($u_{L2}$, $v_{L2}$) same as the first feature point $P_1$. The controller 13 retrieves the second feature point $P_2$ within a predetermined dimensional range centered around the position ($u_{L2}+d$, $v_{L2}$). The predetermined dimensional range may be the range within 1 to 2 pixels from the starting point $P_S$ in the U-axis direction and within 1 to 2 pixels from the starting point $P_S$ in the V-axis direction.

Based on the position of the first feature point $P_1$ and the position of the second feature point $P_2$ that have been extracted, the controller 13 calibrates the first imaging unit 11L, with reference to the second imaging unit 11R.

Here, a concrete example of the calibration performed by the controller 13 is described.

In the following concrete example, a parameter corresponding to translation of the first imaging unit 11L in a direction perpendicular to the baseline length and to the optical axis is set as an external orientation parameter to be updated. The parameter corresponding to translation in the direction perpendicular to the baseline length and to the optical axis extends in the Y-axis direction in the spatial coordinate system illustrated in FIG. 1. X-axis and Y-axis in the spatial coordinate system are respectively parallel to U-axis and V-axis in the image coordinate system.

In a case where the position of the first feature point $P_1$ extracted as above is represented by ($u_{L2}$, $v_{L2}$) and the position of the second feature point $P_2$ extracted as above is represented by ($u_{R2}$, $v_{R2}$), the controller 13 determines that various positions of the first captured image 14L are offset by the shift amount $\Delta v=v_{L2}-v_{R2}$, with reference to the second captured image 14R. The controller 13 determines that the first imaging unit 11L is offset by the shift amount $\Delta Y_L$ in the spatial coordinate system that corresponds to the shift amount $\Delta v$ in the image coordinate system, with reference to the second captured image 14R, and updates the position $Y_L$ of the first imaging unit 11L in the Y-axis direction by using the shift amount $\Delta Y_L$. The controller 13 performs the same processing when the pitch angle φ, which is rotation angle around X-axis, is set as the external orientation parameter to be updated.

Next, processing performed by the image processor 10 according to the present embodiment is described with reference to the flowchart illustrated in FIG. 6. The controller 13 starts the processing upon receiving at least one of a start-up instruction, a stop instruction, and a calibration control executing instruction from the stereo camera device 1.

Firstly, the input interface 12 receives input of the first captured image 14L and the second captured image 14R, which have been respectively generated by the first imaging unit 11L and the second imaging unit 11R (Step S1).

Subsequently, based on the pixel values of the first captured image 14L and the pixel values of the second captured image 14R that have been inputted to the input interface 12, the controller 13 calculates parallax d of the pixels of the first captured image 14L with respect to the corresponding pixels of the second captured image 14R according to the one-dimensional matching (Step S2).

Subsequently, the controller 13 determines the parallax approximate region in the first captured image 14L (Step S3). Then, the controller 13 retrieves from the determined parallax approximate region at least one first feature point $P_1$ for extraction (Step S4). The controller 13 determines whether the extracted first feature point $P_1$ is suitable to be used for calibration processing (Step S5). After that, the controller 13 retrieves from the second captured image 14R the second feature point $P_2$ corresponding to the first feature point $P_1$ that has been determined as suitable to be used for calibration processing, for extraction (Step S6). The first feature point $P_1$ is determined as suitable to be used for calibration processing when the first feature point $P_1$ is not a part of at least one of a linear edge and a repetitive pattern.

Then, based on the first feature point $P_1$ and the second feature point $P_2$, the controller 13 calibrates the first imaging unit 11L, with reference to the second imaging unit 11R (Step S7).

According to the image processing device of the present embodiment, the controller 13 calculates parallax d according to the one-dimensional matching and also extracts at least one first feature point $P_1$ from the region including continuous pixels with deviation in parallax d within a predetermined range. Accordingly, compared with cases where the controller 13 retrieves the first feature point $P_1$ over the entire region of the first captured image 14L according to the two-dimensional matching, the first imaging unit 11L is calibrated rapidly, with reference to the second imaging unit 11R. Since it is highly likely that the pixels constituting the parallax approximate region do not contain noise, the controller 13 is able to extract the first feature point $P_1$ with accuracy. This allows the controller 13 to perform the calibration with accuracy.

According to the image processing device of the present embodiment, the second feature point $P_2$ is extracted based on the first feature point $P_1$ that is different from any first feature point $P_1$ corresponding to a part of at least one of a linear edge and a repetitive pattern. Since the first feature point $P_1$ is neither a part of a linear edge nor a part of a repetitive pattern, a feature point similar to the first feature point $P_1$ is less likely to be included in the first captured image 14L. Similarly, a feature point similar to the first feature point $P_1$ is less likely to be included in the second captured image 14R which corresponds to the first captured image 14L, excluding the second feature point $P_2$ which corresponds to the first feature point $P_1$. Accordingly, the second feature point $P_2$ which corresponds to the first feature point $P_1$, is determined with accuracy and without the second feature point $P_2$ being mistaken for another feature point similar to the first feature point $P_1$.

According to the image processing device of the present embodiment, the controller 13 determines the starting point $P_S$ for the two-dimensional matching based on the position of the first feature point $P_1$ and parallax d at the position, and therefore, the second feature point $P_2$ is retrieved within a range in which the second feature point $P_2$ is very likely to be present. This allows the controller 13 to extract the second feature point $P_2$ rapidly.

According to the image processing device of the present embodiment, since the controller 13 performs the two-dimensional matching with sub-pixel precision, the calibration is performed even when the first imaging unit 11L is offset by a shift amount of less than one pixel, with reference to the second imaging unit 11R. That is, the controller 13 calibrates the first imaging unit 11L with high precision, with reference to the second imaging unit 11R.

Although the present embodiment has been described based on the drawings, it is to be noted that a person skilled in the art may easily make various changes and modifications according to the present disclosure. Such changes and modifications are therefore to be understood as included within the scope of the present disclosure.

For example, in the present embodiment, the controller 13 may use a plurality of first feature points $P_1$ and extract a plurality of second feature points $P_2$ corresponding to the plurality of first feature points $P_1$. In this case, the calibration is performed with high accuracy even when the rho angle $\omega_L$ of the first imaging unit 11L is misaligned with the rho angle $\omega_R$ of the second imaging unit 11R.

Although in the present embodiment the controller 13 calibrates the first imaging unit 11L, with reference to the second imaging unit 11R, the controller 13 may also calibrates the second imaging unit 11R, with reference to the first imaging unit 11L.

Although in the present embodiment the controller 13 extracts the second feature point $P_2$ based on the first feature point $P_1$ extracted from the first captured image 14L, the controller 13 may also extract the first feature point $P_1$ based on the second feature point $P_2$ extracted from the second captured image 14R.

Although in the present embodiment the stereo camera device 1 includes the image processor 10, another device may include the image processor 10, and the controller 13 of the stereo camera device 1 may perform control for calibration based on the first captured image 14L and the second captured image 14R that are inputted from the other device to the input interface 12 via a communication network or the like.

REFERENCE SIGNS LIST

1 Stereo camera device
10 Image processor
11L First imaging unit
11R Second imaging unit
12 Input interface
13 Controller
14L First captured image
14R Second captured image
15 Vehicle
16 Subject region

The invention claimed is:
1. An image processing device, comprising:
an input interface configured to receive input of a first captured image and a second captured image captured by a plurality of imaging units of a stereo camera; and
a controller configured to calculate parallax by performing a one-dimensional matching based on pixel values of the first captured image and pixel values of the second captured image, extract one or more first feature points from a region in the first captured image that includes continuous pixels having a difference in parallax between adjacent pixels which is within a predetermined range, extract one or more second feature points corresponding respectively to the one or more first feature points by performing a two-dimensional matching between the one or more first feature points and pixels in the second captured image, and calibrate at least one of the plurality of imaging units based on positions of the one or more first feature points and positions of the one or more second feature points.

2. The image processing device of claim 1, wherein the controller is configured to perform the two-dimensional matching based on at least one first feature point in the one or more first feature points that is different from the first feature points corresponding to a part of at least one of a linear edge and a repetitive pattern.

3. The image processing device of claim 1, wherein the controller is configured to determine a starting point for the two-dimensional matching based on positions of the one or more first feature points and parallax at the positions.

4. The image processing device of claim 1, wherein the controller is configured to perform the two-dimensional matching with sub-pixel precision.

5. The image processing device of claim 1, wherein the one or more first feature points extracted from the first captured image by the controller comprise a plurality of first feature points, and the one or more second feature points extracted from the second captured image by the controller comprise a plurality of second feature points corresponding respectively to the plurality of first feature points, and the controller is configured to calibrate at least one of the plurality of imaging units based on positions of the plurality of first feature points and positions of the plurality of second feature points corresponding to the plurality of first feature points.

6. The image processing device of claim 5, wherein the controller is configured to calibrate a posture of the stereo camera based on the positions of the plurality of first feature points and the positions of the plurality of second feature points.

7. A stereo camera device, comprising:
a plurality of imaging units; and
an image processing device including an input interface configured to receive input of a first captured image and a second captured image captured by the plurality of imaging units, and a controller configured to calculate parallax by performing a one-dimensional matching based on pixel values of the first captured image and pixel values of the second captured image, extract one or more first feature points from a region in the first captured image that includes continuous pixels having a difference in parallax which is within a predetermined range, extract one or more second feature points corresponding respectively to the one or more first feature points by performing a two-dimensional matching between the one or more first feature points and pixels in the second captured image, and calibrate at least one of the plurality of imaging units based on positions of the one or more first feature points and positions of the one or more second feature points.

8. A vehicle, comprising
a stereo camera device, including:
a plurality of imaging units; and
a stereo camera device including an input interface configured to receive input of a first captured image and a second captured image captured by the plurality of imaging units, and a controller configured to calculate parallax by performing a one-dimensional matching based on pixel values of the first captured image and pixel values of the second captured image, extract one or more first feature points from a region in the first captured image that includes continuous pixels having a difference in parallax which is within a predetermined range, extract one or more second feature points corresponding respectively to the one or more first feature points by performing a two-dimensional matching between the one or more first feature points and pixels in the second captured image, and calibrate at least one of the plurality of imaging units based on positions of the one or more first feature points and positions of the one or more second feature points.

9. An image processing method, in which a controller in an image processing device performs steps comprising
calculating parallax by performing a one-dimensional matching based on pixel values in a first captured image captured by a first imaging unit in a plurality of imaging units and pixel values in a second captured image captured by a second imaging unit in the plurality of imaging units that is different from the first imaging unit;
extracting one or more first feature points from a region in the first captured image that includes continuous pixels having a difference in parallax which is within a predetermined range;
extract one or more second feature points corresponding respectively to the one or more first feature points by performing a two-dimensional matching between the one or more first feature points and pixels in the second captured image; and
calibrating at least one of the plurality of imaging units based on positions of the one or more first feature points and positions of the one or more second feature points.

* * * * *